Aug. 23, 1960 R. E. MAPLES 2,950,069

TAPE RECORDER CONTROL MECHANISM

Filed Jan. 5, 1955 6 Sheets-Sheet 1

INVENTOR.

BY Richard E. Maples.

Harness, Dickey & Pierce.
ATTORNEYS

Aug. 23, 1960 R. E. MAPLES 2,950,069

TAPE RECORDER CONTROL MECHANISM

Filed Jan. 5, 1955 6 Sheets-Sheet 2

Rewind Position

INVENTOR.
Richard E. Maples
BY
Harness, Dickey + Pierce.
ATTORNEYS.

TAPE RECORDER CONTROL MECHANISM

Filed Jan. 5, 1955

INVENTOR.
Richard E. Maples
BY
Harness, Dickey & Pierce
ATTORNEYS

Pause Position.

INVENTOR.
Richard E. Maples.
BY
Harness, Dickey, & Pierce.
ATTORNEYS.

Aug. 23, 1960 R. E. MAPLES 2,950,069

TAPE RECORDER CONTROL MECHANISM

Filed Jan. 5, 1955 6 Sheets-Sheet 5

Record Playback Position.

INVENTOR.
Richard E. Maples.
BY
Harness, Dickey & Pierce.
ATTORNEYS.

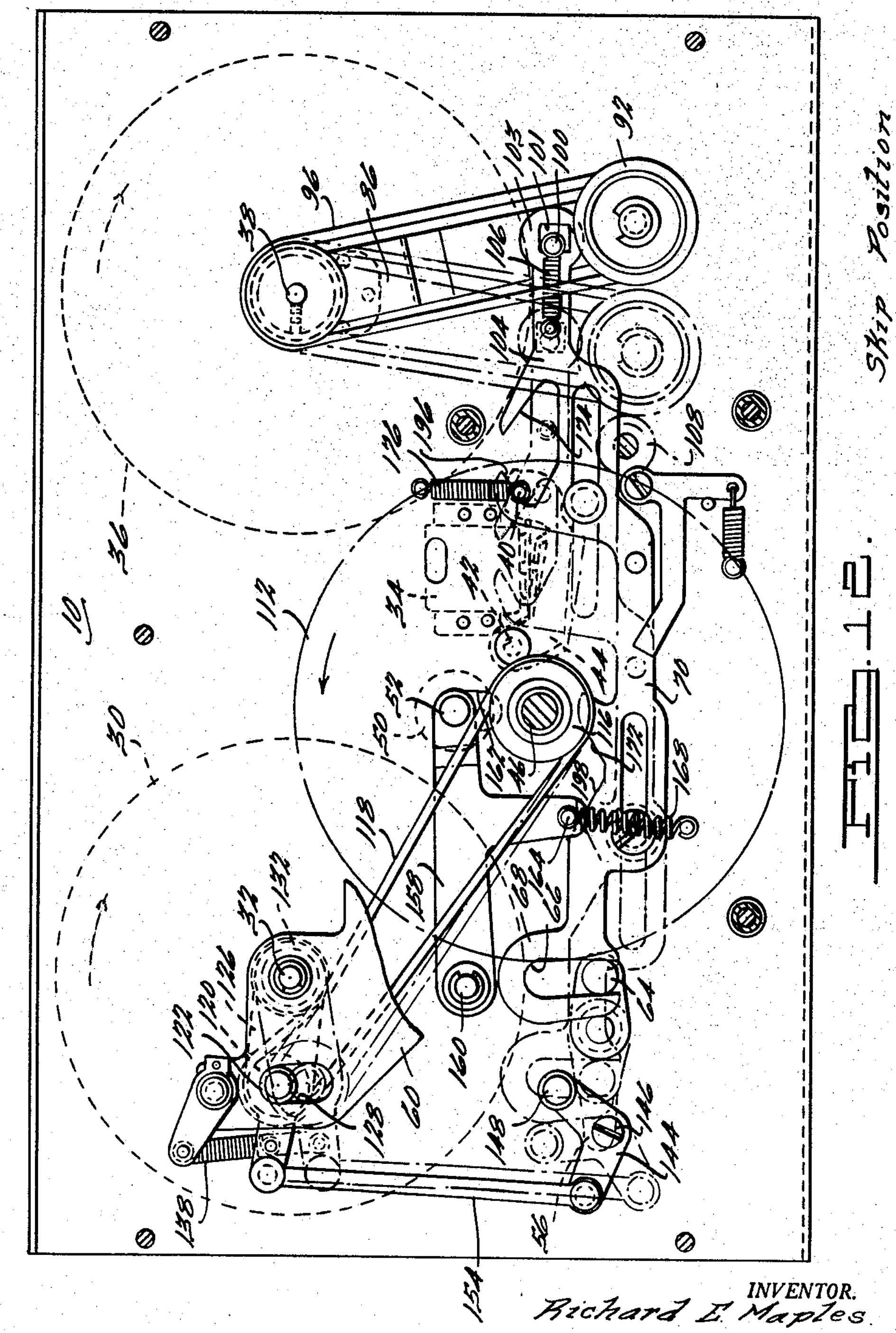
FIG. 12. Skip Position
INVENTOR.
Richard E. Maples
BY
Harness, Dickey & Pierce
ATTORNEYS.

United States Patent Office 2,950,069

Patented Aug. 23, 1960

2,950,069

TAPE RECORDER CONTROL MECHANISM

Richard E. Maples, 5755 N. Elston Ave., Ashley, Ohio

Filed Jan. 5, 1955, Ser. No. 479,889

11 Claims. (Cl. 242—55.12)

This invention relates to control mechanisms and more particularly to control mechanisms for magnetic tape recording devices.

The object of this invention is to improve, simplify and reduce the cost of manufacture of magnetic recording mechanisms.

A feature of this invention is the provision of a single lever for controlling the operation of the mechanical elements of a recording mechanism.

Another feature of this invention is an improved means for both driving and braking a tape-carrying reel.

A further feature of this invention is an improved means for governing the speed of rotation of a driven member.

Another feature of this invention is an improved and simplified means for advancing a tape recording medium at a speed greater than the recording speed.

Another feature of this invention is an improved means for reducing the possibility of damage to the record medium when the direction of its motion is reversed.

The manner in which the foregoing object and features are attained, and other objects and features of the invention will be perceived from the following detailed description of an embodiment of the invention when read with reference to the accompanying drawings in which.

Figure 3:
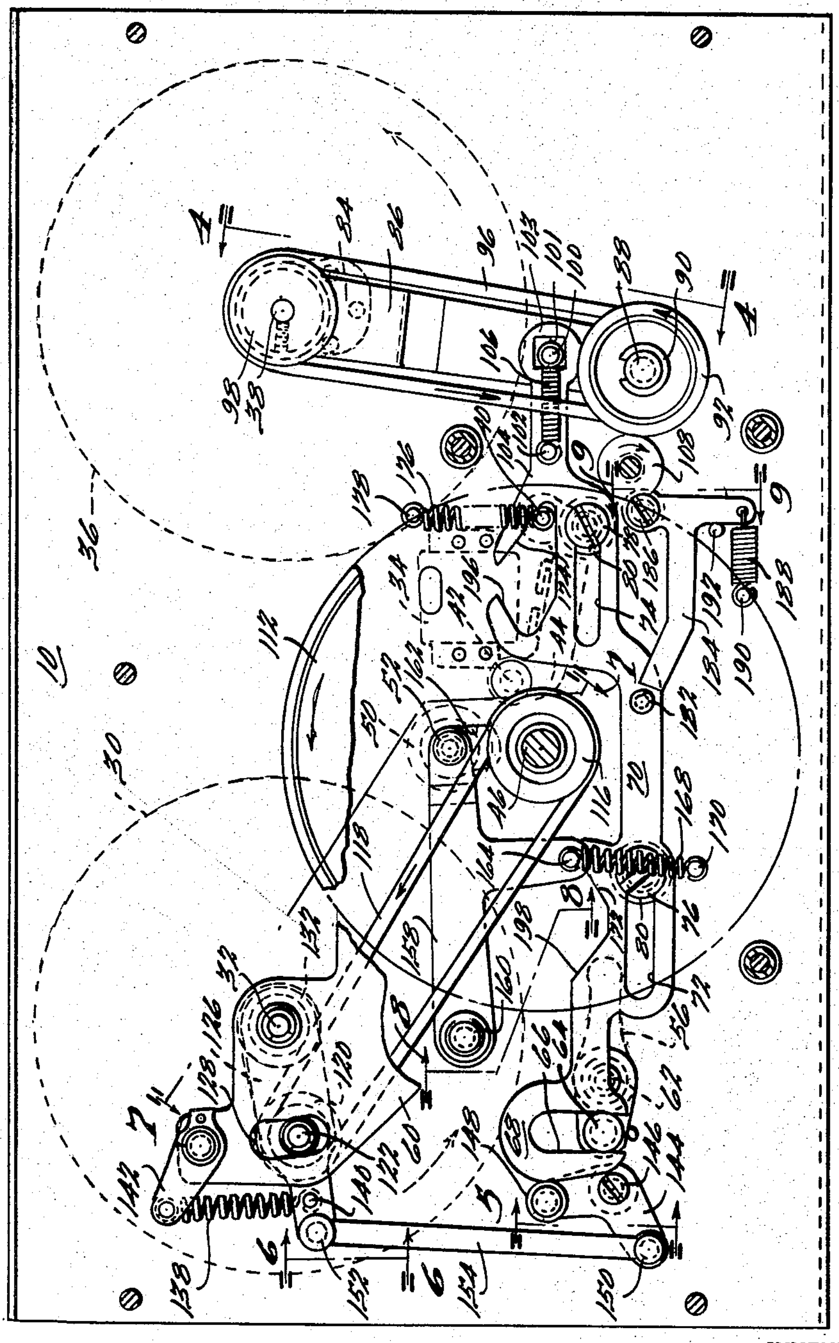
Fig. 3 is a rear elevational view of the apparatus of Fig. 1 with part of the equipment shown in Fig. 2 being deleted and other parts being cut away more clearly to show the cooperative relationship of the elements, those elements being shown in a first operating position.
Figure 11:
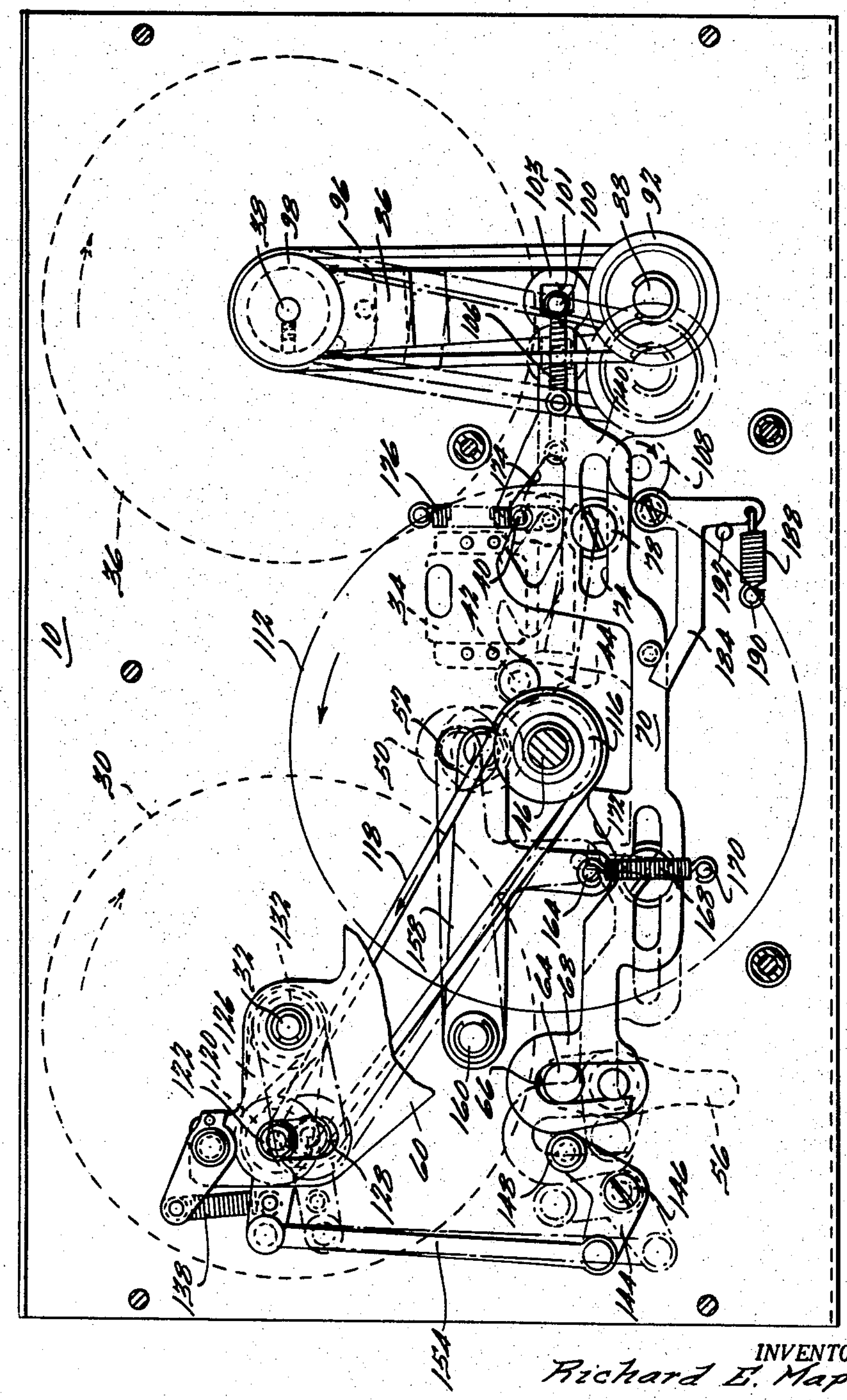

Fig. 11 is a rear elevational view similar to that of Fig. 3 showing the mechanism in a third position of operation, the position of the mechanism in the first position, as represented in Fig. 3 of the drawings, being schematically represented by dot-dash lines; and Fig. 12 is a rear elevational view similar to that of Fig. 3 showing the mechanism in a fourth position of operation, the position of the mechanism in the first position, as represented in Fig. 3 of the drawings, being schematically represented by dot-dash lines.

Figures 1, 2:
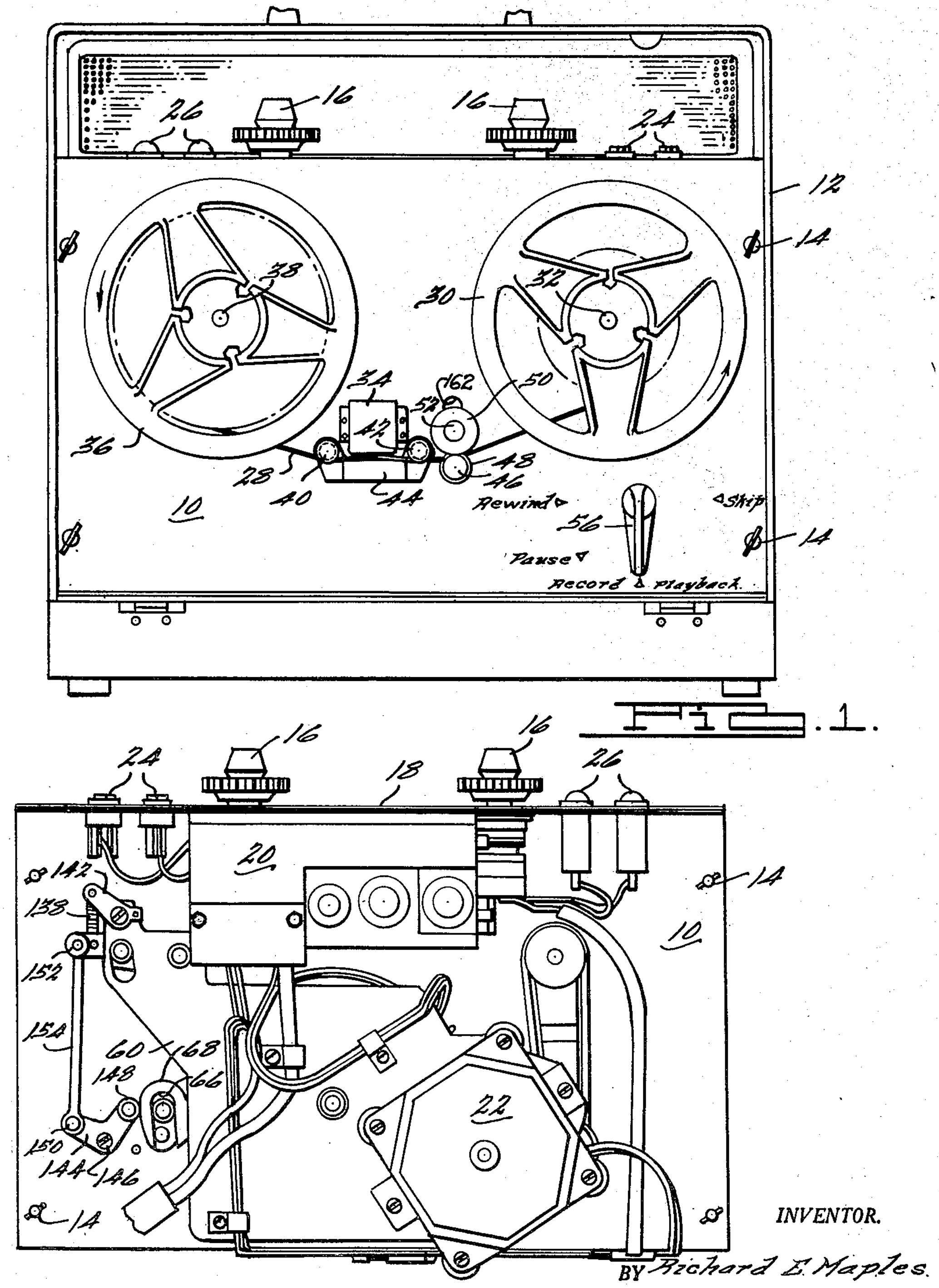
Fig. 1 is a front elevational view of a tape recording mechanism embodying the principles of the invention, shown mounted in a carrying container.
Fig. 2 is a rear elevational view of the mechanism of Fig. 1 shown removed from its carrying container.

As may best be seen in Fig. 1 of the drawings, the tape recording mechanism is mounted upon a sheet-metal panel 10 which is retained in position in a carrying case 12 by means of toggles 14 or other similar fastening means. The carrying case 12, the front cover of which is not shown, may be and preferably is of the type shown in my copending application Serial No. 446,047, filed July 27, 1954, now Patent No. 2,851,526. As may be seen both in Fig. 1, showing the panel-mounted mechanism secured in the carrying case, and in Fig. 2, showing the panel and the mechanism mounted thereon removed from the carrying case and reversed to expose the rear thereof, a pair of knobs 16 extends upwardly through a flange 18 on the panel 10. Knobs 16 perform conventional electrical functions of, for example, volume control, tone control, switching the electrical circuits 20 between a recording and a listening or play-back position, and controlling the application of line voltage both to the electrical circuit elements 20 and the motor 22, this being accomplishable in the disclosed embodiment of the invention, by the provision of a pair of dual knobs on concentric control shafts in a manner well known in the art.

A pair of jacks 24 may also be mounted upon the flange portion 18 of the panel 10 to permit the ready association with the tape recording equipment of an external microphone, a radio tuner, an external loudspeaker, a head set, or an external audio amplifier. Pilot lights 26, also mounted on the flange portion 18, may be employed to indicate the energized or de-energized condition of the apparatus, to indicate whether the equipment is in the recording or play back position, or one of the elements 26 may be a recording-level indicator.

The principles of the invention are exemplarily embodied in a system for selectively orienting the elements of a magnetizable medium 28, supplied in tape form, by electromagnetic means to establish a magnetic record of acoustic information translated into electrical form, and for electromagnetically sensing that orientation to translate the magnetically recorded information into electrical energy for application to an electro-acoustic transducer. A suitable form of magnetizable medium 28 is available in tape wound upon a supply reel 36 on the commercial market.

Supply reel 36 is mounted upon a spindle 38 and the tape 28 is transported past a magnetic head assembly 34 and rolled upon a take-up reel 30 mounted upon a spindle 32. The course of travel of the tape 28 is determined, in part, by a pair of shafts 40 and 42, the outer surfaces of which are conformed to serve as tape guides. Shaft 40 is mounted upon a pressure pad 44, pivotally mounted about the longitudinal axis of shaft 42. Pad 44 is adapted to press the moving tape 28 into intimate engagement with the face of the head assembly 34, which comprises one or more electromagnetic elements serving the conventional functions of recording, erasing, and reproducing or playing back the information upon the tape 28.

During either the recording or the playing back operations, tape 28 is transported from the supply reel 36 to the take-up reel 30 by means of a capstan 46 driven by the motor 22. The tape 28 is held in tight frictional engagement with the capstan 46 by means of a rubber pressure roll 50 mounted upon a rotatable stud 52 which is capable of being moved towards or away from the capstan 46 in a slot 54 in the panel 10 in a manner hereinafter to be described.

The mechanical equipment is capable of being placed in four separate positions of operation: a record and playback position in which the tape 28 is advanced from the supply reel 36 past the head assembly 34 and on to the take-up reel 30 at a controlled rate of speed; a skip position in which the tape is advanced as aforesaid but at a more rapid rate to permit skipping a portion of the tape either during the recording or play-back operations; a rewind position in which the tape is transported from the take-up reel 30 back to the supply reel 36, preferably at a relatively high rate of speed; and a pause position in which the rapid motion of the tape 28 from the take-up reel 30 to the supply reel 36 during the rewind operation is terminated preparatory to reversing the direction of motion of the tape 28 for recording or playing back. Each of a plurality of the mechanical elements must be operated and/or positioned differently for each of these operational positions. The shifting of the positions or of the conditions of operation of all of the mechanical elements is controlled by a single control lever 56 positioned upon the face of the panel 10.

During the record-playback position, the position in which the apparatus in Figs. 1 and 2 is shown, the pressure roll 50 is positioned against the capstan 46 so as to drive the tape from the supply reel 36 to the take-up reel 30 at a precisely controlled rate of speed, the pressure pad 44 is positioned adjacent the head assembly 34 to hold the tape 28 tightly against the face of that head assembly, an unvarying retarding force is applied to oppose the counterclockwise motion of the supply reel 36 to insure that it will not over-travel and to insure that the tape 28 will not vary in speed during its motion across the face of the head assembly 34, and the take-up reel 30 is driven in a counterclockwise direction to pick up the tape 28 which has passed the head assembly 34. The reel 30 is driven at a speed such that the tape, if there were no slippage, would be taken up on the reel 30 at a rate in excess of that of which it is supplied by the rotation of the capstan 46 even when there is little or no tape upon the take-up reel 30 to provide an enlarged-diameter arbor. Since however, as will be seen, there is a frictional drive between the motor 22 and the take-up reel 30, slippage will occur, so that a substantially constant pick-up force will be exerted upon the tape 28 and so that the absolute speed of rotation of the reel 30 will be greater when there is no tape build-up upon the spindle 32 than when a substantial amount of tape has been rolled upon the take-up reel 30.

Since the drive to the take-up reel 30 is such that the tape 28 is capable of being rolled upon the reel 30 at a rate in excess of the rate at which it is delivered to that reel during the recording and play-back operation, a skipping operation may be performed by permitting the take-up reel 30 to travel at its freely driven speed, i.e., by eliminating the control upon the speed of tape 28 so that the reel 30 may rotate without slippage. The primary motion-inhibiting and controlling influences upon the tape 28 during the record or playback operation are the capstan 46 with its pressure roll 50, and the head assembly 34 with its pressure pad 44. Therefore, when the control lever 56 is switched to the skip position, the pressure pad 44 is rotated through a small angle in a counterclockwise direction about the shaft 42 to free the tape 28 from its intimate engagement with the head assembly 34, and the stud 52 is moved upwardly in its slot 162 to relieve the pressure exerted by the pressure roll 50, thereby relieving the tape 28 from driving engagement with the capstan 46. Whether slippage does or does not occur depends, of course, upon the nature of the frictional drive between the motor 22 and the take-up reel 30, and upon the amount of drag impeding counterclockwise motion of the supply reel 36. However, whether slippage does or does not occur, it is substantially less in the skip position than it is in the record-playback position so that the rate of motion of the tape 28 is substantially increased. If desired, the pressure pad 44 may be rotated to a sufficient degree that the tape 28 is completely out of contact with and out of the field of the head assembly 34. However, it has been found desirable to merely relieve the pressure exerted by the pressure pad 44 so that the tape continues to be loosely engaged with the head assembly 34 whereby an incoherent but audible reproduction of the recorded material is obtained so that the operator may be able to ascertain discontinuities in the reproduction representing the termination of the portion which he desires to skip. It will be recognized that, if this arrangement is employed, it may be desirable to place the electrical circuit elements 20 in the playback position rather than in the record position during the skipping operation.

When it is desired to return the tape from the take-up reel 30 to the supply reel 36, the control lever 56 is rotated in a clockwise direction to the rewind position. In so doing, the supply reel 36 is positively driven in a clockwise direction, the pressure pad 44 is rotated away from the tape 28 to a greater degree than it was during the skipping operation, the pressure roll 50 is moved away from the capstan 46 so as to relieve the engagement between the tape 28 and the capstan 46, and a controlled and constant retarding force is imposed to the clockwise rotation of the take-up reel 30 to insure that the tape 28 will be wound under uniform tension upon the supply reel 36 and to insure that the supply reel 36 will not over-travel during the rewinding operation.

It will be perceived that in switching from the rewind position to the record-playback position, the tape 28 must be reversed in its direction of travel from a high speed in one direction, during rewind, to a relatively slow speed in the other direction, during recording or playing back. This tends to impose substantial stresses upon the tape 28 resulting from the fact that the motion from right to left (Fig. 1) of the tape 28 during rewinding is abruptly halted either due to the engagement of the pressure pad 44 with the tape, to the engagement of the pressure roll 50 with the tape or to the abrupt reversal of rotational direction of the take-up reel 30, or a combination of these factors. Consequently, provision is made to pause between the rewind and the record-playback positions to insure that the tape 28 will not be subjected to such stresses. Thus, as the control lever 56 is rotated in a counterclockwise direction from the rewind to the record-playback position, the level will tend to stop in the pause position and an additional force must be exerted to continue the motion of the control lever 56 to the record-playback position. During this pause interval, the driving force is relieved from the supply reel 36 and means are effective to brake the take-up reel 30.

Figure 10:
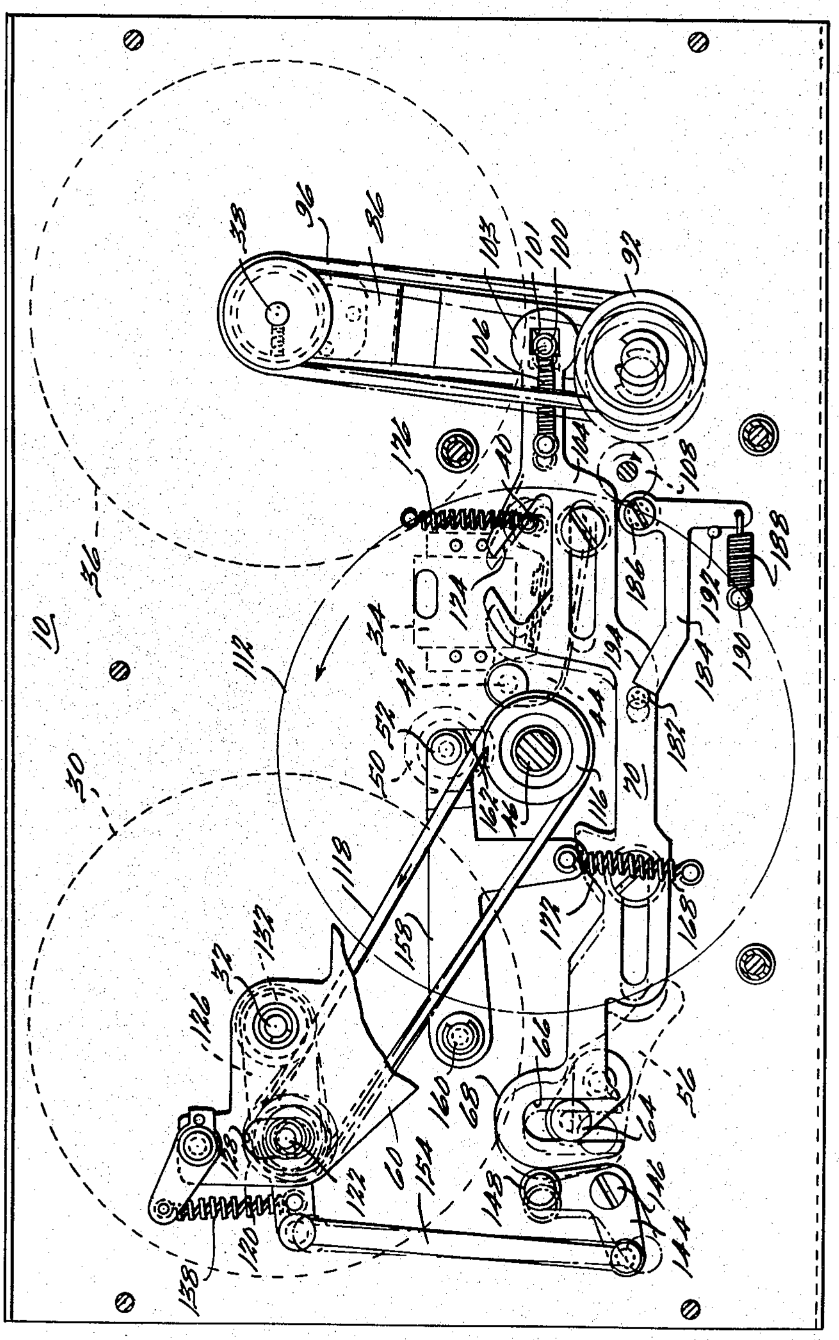
Fig. 10 is a rear elevational view similar to that of Fig. 3 showing the mechanism in a second position of operation, the position of the mechanism in the first position, as represented in Fig. 3 of the drawings, being schematically represented by dot-dash lines.

The various mechanical components of the tape recorder mechanism are either mounted upon the front panel 10 or upon a sub-plate 60 (Fig. 2). In order most clearly to represent the operative relationship of the mechanical parts during the several operational positions, all of the electrical components shown in Fig. 2 of the drawings have been deleted and a portion of the sub-plate 60 cut away in the view of Fig. 3, showing the relationship of the elements during the rewind operation, in the view of Fig. 10, showing the relationship of the elements during the pause position, in the view of Fig. 11, showing the positional relationship of the elements during the record or playback position, and in the view of Fig. 12, showing the relationship of the elements during the skip or fast-forward position. To facilitate understanding of the changes in operational relationships that occur during the several positions, the position of the elements as they exist in the rewind position (Fig. 3) is represented in dot-dash lines in each of the other operational positions shown in Figs. 10 to 12.

Referring to Fig. 3 of the drawings, the control lever 56 (which is hidden and therefore represented in dotted lines in Fig. 3) is pivoted about a shaft 62 carrying an actuating stud 64. Stud 64 engages an elongated aperture 66 in a U-shaped member 68 which is an element of a unitary control slide 70. Control slide 70 is adapted to move, under the control of lever 56, longitudinally in translation. Thus, control slide 70 is provided with a pair of elongated slots 72 and 74 engaging studs affixed to the front panel 10 provided with enlarged heads 76 and 78, respectively, overlying a portion of the rear surface (the face nearest the viewer) of the control slide 70. Each of these studs may be provided with a washer 80 loosely underlying the control slide 70, i.e., loosely engaging the front face of the control slide 70 so as to retain the slide 70 in position. With the control lever 56 moved to the rewind position, as shown in Fig. 3, the control slide 70 is in its leftwardmost posiion.

As before noted, in the rewind position, the supply reel 36 is positively driven in a clockwise direction in the view of Fig. 1 and in a counterclockwise direction in the view of Fig. 3, a force is imposed retarding the motion of the take-up reel 30 in a clockwise direction in the showing of Fig. 1 or counterclockwise direction in the showing of Fig. 3, the pressure pad 44 is rotated away from the head assembly 34 to relieve the pressure on the tape, and the pressure roll 50 is moved away from the capstan 46 to relieve the controlled driving force on the tape at this point.

Figure 4:
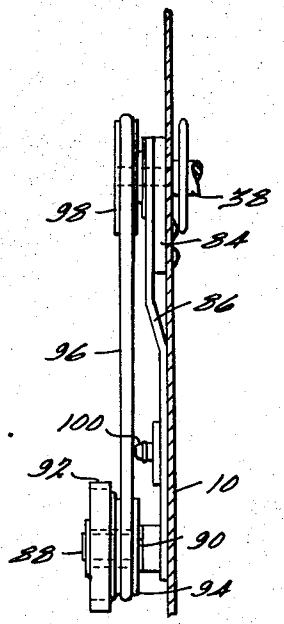
Fig. 4 is a sectional view taken substantially along the line 4—4 of Fig. 3.

Thus, the spindle 38, to which the supply reel 36 is affixed, is rotatably mounted in the front panel 10 by means of a bearing member 84 as may best be seen in Figs. 3 and 4 of the drawings. An arm 86 is rotatably mounted about the spindle 38 and extends downwardly to support a trunnion 88 affixed thereto. Rotatably mounted on the stud 88 by means of a bearing 90 is a rubber or rubber-tired rewind wheel 92 integral with a pulley 94. A belt 96 extends, under tension, between the pulley 94 and a pulley 98 mounted upon and rotatable with the spindle 38.

Arm 86 is provided with an upstanding stud 100 at a point intermediate the spindle 38 and the trunnion 88, but preferably closer to the latter. Another stud 102 is mounted upon an extension 104 of the control slide 70 (Fig. 3). A tensioned spring 106 extends between the studs 100 and 102. The extension 104 of the slide 70 terminates in an enlarged portion 103 provided with an aperture 101 engaging, but greater in size than, the stud 100, when the control slide 70 is moved to its leftwardmost position as a result of the turning of the control lever 56 to the rewind position, a force is exerted through the stud 102, the spring 106, and the stud 100 to rotate the arm 86 about the spindle 38 to the position shown in Fig. 3 in which the rewind wheel 92 is in engagement with the shaft 108 of the motor 22 (Fig. 2). The motor shaft 108 may be merely a metallic extension of the rotor of the motor 22, may be an enlarged metallic portion on that shaft or may be provided with a tire of resilient material in a manner well known in the art. By virtue of this arrangement, the rewind wheel 92 is resiliently forced into engagement with the motor shaft 108 so that there is a less than abrupt application of the load to the motor, preventing motor stalling, and yet sufficient pressure is exerted by spring 106 so that there is little or no slippage between the rewind wheel and the motor shaft 108 during the rewind operation.

Since at any time that the appropriate on-off control switch 16 is on, the motor 22 is operative to rotate the shaft 108 in a clockwise direction (Fig. 3), a rotational force will be transmitted to drive the rewind wheel 92, the pulley 94, the belt 96, the pulley 98, the spindle 38, and hence the supply wheel 36 in a counterclockwise direction as viewed from the rear in Fig. 3 or in a clockwise direction when viewed from the front as in Fig. 1. The ratios are established so that the speed of rewind is relatively high so that the tape may be returned to the supply reel from the take-up reel in a relatively short length of time.

Figure 7:
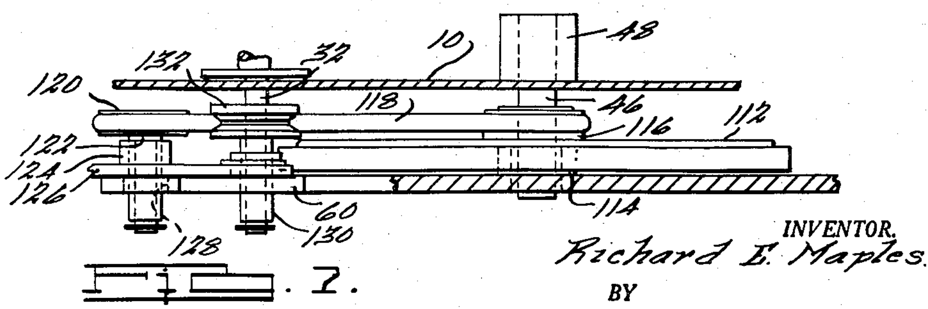
Fig. 7 is a sectional view taken substantially along the line 7—7 of Fig. 3, part of the elements being deleted.

The motor shaft 108 continually engages the rubber-covered periphery of, or a rubber tire mounted upon, a relatively massive flywheel 112 rotatably mounted upon the capstan shaft 46 adjacent the sub-plate 60. Flywheel 112 is partially cut away in the view of Fig. 3. The inter-relationship of these elements may best be seen in Fig. 7 of the drawings which is a sectional view taken substantially along the line 7—7 of Fig. 3, but with the stud 52 and the capstan pressure roll 50 and certain other parts being deleted for clarity of presentation. In that figure it will be seen that the capstan shaft 46 extends through the front panel 10 and is rotatably mounted upon the subplate 60 by means of a bearing element 114. The bearing element 114 also supports the massive flywheel 112 which is integrally related to a pulley 116. It will be noted that the flywheel 112, and the pulley 116 both rotate with the capstan shaft 46 at any time the driving motor is energized since the motor shaft 108 is continuously in engagement with the periphery of the flywheel 112.

Pulley 116, in rotating, drives rubber belt 118 which extends around an idler pulley 120 affixed to an idler shaft 122. The idler shaft 122 is rotatably mounted, by means of a bearing assembly 124, in an idler wheel bearing plate 126, the idler shaft 122 and a portion of the bearing assembly extending through an elongated arcuate slot 128 (Fig. 3) in the subplate 60. The bearing plate 126 is pivotally mounted upon the outer surface of a bearing member 130 affixed to the subplate 60, the inner surface of bearing member 130 accepting and rotatably supporting the take-up reel spindle 32. A plastic roller 132 is rigidly mounted upon the take-up reel spindle 32 so as to be rotatable therewith.

By virtue of this construction, at any time that the motor shaft 108 is rotated in a clockwise direction (as viewed in Fig. 3), the flywheel 112 is rotated to drive the belt pulley 116 in a counterclockwise direction whereby the belt 118 is driven over a counterclockwise course around the idler pulley 120, which therefore rotates in a counterclockwise direction. The physical relationship of the elements is such that the laminated plastic roller 132 is continuously in engagement with the rubber belt 118. However, the effective extent of this engagement is varied among the several operative conditions of the mechanism by varying the position of the idler pulley 120 and hence the force with which the rubber belt 118 is pressed against the plastic roller 132.

The idler wheel bearing plate 126 is controllably rotatable about an axis exemplarily shown as the take-up reel spindle 32. In the rewind position, as represented in Fig. 3 of the drawings, the bearing plate 126 is in its lowest or most counterclockwise position. It is biased, however, to its uppermost or most clockwise position (to be shown hereinafter) by means of a spring 138 affixed to a stud 140 on the bearing plate 126 and anchored to a lug 142 rigidly mounted upon an upper extension of the subplate 60.

Figure 6:
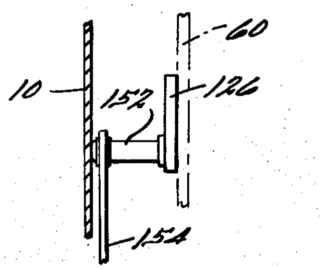
Fig. 6 is a sectional view taken substantially along the line 6—6 of Fig. 3.
Figure 5:
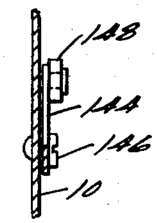
Fig. 5 is a sectional view taken substantially along the line 5—5 of Fig. 3.

The position of the idler wheel bearing plate 126 is controlled by means including a bellcrank 144 rotatably mounted about its mid point by means of a screw 146 attached to the front panel 10 as may best be seen in the sectional view of Fig. 5 of the drawings. The upper arm of the bellcrank 144 carries a roller 148 rotatably mounted thereupon and adapted rotatably to engage a camming surface on the front edge of the portion 68 (Fig. 3) of the control slide 70 in at least certain of the operative positions of the mechanism. The lower arm of the bellcrank 144 carries a stud 150 and a similar stud 152 is rigidly mounted upon the left-hand end of the idler wheel bearing plate 126, the details of the latter stud being apparent in the sectional view of Fig. 6 of the drawings.

A rigid link 154 is rotatably mounted upon the studs 150 and 152, extending therebetween. By virtue of the force exerted by spring 138, transmitted through the described linkage, the roller 148 on the bellcrank 144 is pressed against, or at least toward, the camming surface of the portion 68 of the control slide 70. Therefor, with the control lever 56 turned to the rewind position whereby the control slide 70 is moved to its leftwardmost position as shown, the bellcrank 144 is rotated in a counterclockwise direction to the shown position, whereby forces are exerted through the linkage including link 154 to rotate the idler wheel bearing plate 126 counterclockwise to its lowest position as shown, the idler shaft 122 freely moving in the elongated arcuate aperture 128.

In the rewind position, the belt 118 is forced against the periphery of the roller 132 with less force than it is in any other of the operative conditions of the mechanism. However, the rubber belt 118 and the laminated plastic roller 132 are in contact so that a force is exerted through the belt 118 tangential of the roller 132 tending to rotate the roller 132, and hence the take-up reel 30, in a clockwise direction as viewed in Fig. 3 of the drawings. It will be recalled, however, that the apparatus functions in the rewind position to transport the tape from the take-up reel to the supply reel, the supply reel 36 being positively driven in a counterclockwise direction (as viewed in Fig. 3) as previously described. Consequently, the tape is pulled from the take-up reel 30, forcing that reel to rotate in a counterclockwise direction. Since the rotational force exerted by the pulled tape is greatly in excess of the rotational force exerted upon the roller 132 by the rubber belt 118, the roller 132 is forced to rotate in a counterclockwise direction against the rotational force exerted by the rubber belt 118. As a result, the slippage between the roller 132 and the belt 118 is high. By virtue of this arrangement, an exceedingly uniform restraining force or drag is imposed upon the counterclockwise rotation of the take-up reel 30 to impose a uniform retarding load or drag upon the movement of the tape, maintaining it taut, to insure that the tape is uniformly wound upon the supply reel 36 and to insure that there is no over-travel of the take-up reel 30.

Figure 8:
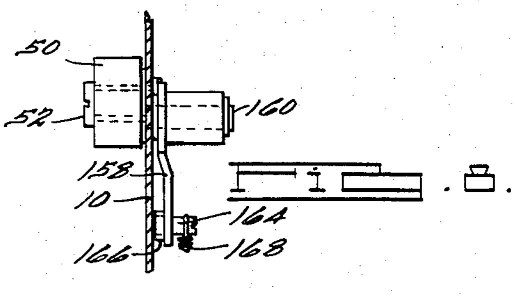
Fig. 8 is a sectional view taken substantially along the line 8—8 of Fig. 3.

Since the capstan 46 continually rotates whenever the machine is turned on, in order for the tape to be transported at high speed from the take-up reel to the supply reel during the rewind operation, the rubber pressure roll 50 must be moved away from the capstan 46 to permit the tape freely to travel to the supply reel 36. This is accomplished by the provision of a bifurcated pressure roll arm 158 pivotally mounted upon a stud 160 staked or otherwise affixed to the front panel 10, as may be seen in Figs. 3 and 8 of the drawings. The stud 52 supporting the capstan pressure roll 50 extends through an elongated aperture 162 in the front panel 10 (Fig. 3) and is anchored to the end of the upper bifurcation of the pressure roll arm 158. A stud 164, secured near the lower end of the lower bifurcation of the pressure arm 158, rotatably supports a roller 166 (Fig. 8) positioned between the pressure roll arm 158 and the panel 10. Spring 168 (Fig. 3) engages the stud 164 and is anchored to a stud 170 mounted on the panel 10, spring 168 exerting a force tending to rotate the pressure roll arm 158 in a clockwise direction about the stud 160 thereby tending to carry the capstan pressure roll 50 towards capstan shaft 46. However, when the apparatus is shifted to the rewind position as shown in Fig. 3 of the drawings, a camming surface 172 upon the control slide 70 engages the roller 166 to force the pressure roll arm 158 in a counterclockwise rotational direction to the position shown in Fig. 3 wherein the pressure roll 50 is separated from the capstan 46 by a substantial distance, thereby permitting free motion of the tape 28 past the capstan.

As was before noted, the pressure pad 44 is pivotally mounted about a shaft 42, the outer portion of which serves as a tape guide. The other shaft 40, the outer portion of which serves as a second tape guide, extends through an arcuate elongated slot (not shown) in the front panel 10, is provided with a roller (not shown) adapted to engage a camming surface 174 upon the control slide 70, and is engaged by a spring 176 which is anchored to a stud 178 affixed to the front panel 10. The spring 176 is placed under tension so as to tend to rotate the pressure pad 44 towards the head assembly 34. However, as the control slide 70 is moved to the left to the rewind position, the camming surface 174 on that slide forces the pressure pad 44 to rotate in a clockwise direction to the position shown wherein it is spaced from the head assembly 34 to permit the tape 28 freely to move past the head 34.

It will therefore be seen that in the rewind position the supply reel 36 is positively driven in a counterclockwise direction, the take-up reel 30 is forced to rotate in a counterclockwise direction due to the motion of the tape and in opposition to the retarding force exerted thereupon by the rubber belt 118, the rubber pressure roll 50 is moved away from the capstan shaft 46 and the pressure pad 44 is moved away from the head assembly 34 so that the motion of the tape is not retarded by these elements. In this fashion, the tape, or a portion of it, is transferred from the take-up reel 30 to the supply reel 36 at a relatively high rate of speed.

It has been found to be desirable to conform the control slide 70 and its associated linkages to that of the above described shifting mechanical relationships, the engagement between the motor shaft 108 and the rewind wheel 92 is the last to occur so that the tape will be free to be transported to the supply reel 36 before the rotational force is applied to that supply reel.

In the rewind position, as represented in Fig. 3 of the drawings, the supply reel 36 is positively driven in a counterclockwise direction, a drag is applied to the take-up reel 30, and the capstan pressure roll 50 and the pressure pad 44 are both relieved from engagement with the tape. In the record and play-back position, represented in Fig. 1 of the drawings and by the solid-line representation in Fig. 11 of the drawings, a force is applied to rotate the take-up reel 30 in a clockwise direction (in the view of Fig. 11), the supply reel 36 is rotated in a clockwise direction as a result of the pulling of the tape therefrom, and the capstan pressure roll 50 and the pressure pad 44 are shifted into engagement with the tape. Consequently, the direction of rotation of the two reels must be reversed between the rewind and the record-playback position, which, if abruptly performed, might tend to impose undue stresses upon the tape and possibly to cause spillage. Means are therefore provided for establishing a temporary operational position intermediate the rewind and the record-playback positions, to create a short-duration pause.

Figure 9:
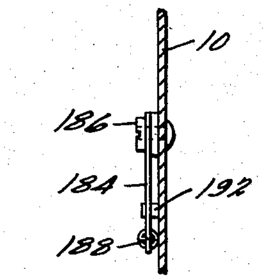
Fig. 9 is a sectional view taken substantially along the line 9—9 of Fig. 3.

Thus, as the control lever 56 is rotated toward the record-playback position from the rewind position, the control slide 70 is moved to the right in translation by virtue of the effect of the motion of the actuating stud 64 upon the surface 66 of the portion 68 of the control slide 70. However, as the control slide 70 moves to the right, a stud or pin 182 affixed thereto strikes the end of a detent 184 which is pivotally mounted upon the panel 10. The nature of this pivotal mounting may be clearly seen in Fig. 9 of the drawings which is a section taken substantially along the line 9—9 of Fig. 3. A force is exerted by a spring 188 (Fig. 10), anchored to a stud 190 affixed to the front panel 10, upon a downwardly extending arm of the detent 184 to force that arm into contact with a stop pin 192 also affixed to the front panel 10. Therefore, as the operator turns the control lever 56, he finds that at a point intermediate the rewind and the record-playback positions, further motion of the control lever 56 is impeded and that he must exert additional force in order to move the control lever 56 beyond this point.

At this intermediate or "pause" position, the change in position of the capstan pressure roll 50 and of the pressure pad 44 is unsubstantial. However, the moment applied to rotate the take-up reel 30 in a clockwise direction (Fig. 10) is somewhat increased and the driving force for rotating the supply reel in a counterclockwise direction is totally relieved.

When the control slide 70 is moved slightly to the right from the rewind to the pause position, the bellcrank 144 is permitted to be rotated slightly in a clockwise direction, the link 154 is permitted to be elevated and the bearing plate 126 is permitted to be rotated slightly in a clockwise direction, all under the influence of spring 138. The resultant clockwise displacement of the idler pulley 120 results in the application of an increased force by the belt 118 normal to the rotational axis of the take-up reel spindle 32 to increase the frictional engagement therebetween thereby tending to brake the counterclockwise rotation of the take-up reel 30 and to institute a clockwise rotation of that reel. When the control slide 70 is moved from the rewind position, shown in dot-dash lines in Fig. 10, to the pause position, shown in solid or dotted lines, the left-hand edge of the aperture 101 in the enlarged end portion 103 of the control slide 70 forces the stud 100 to the right to rotate the rewind wheel arm 86 through a small counterclockwise angle to the position shown in solid lines in Fig. 10 wherein the rewind wheel 92 is disengaged from the motor shaft 108.

If additional force is applied to the control lever 56 tending to force the control slide 70 further to the right, the detent 184 is so cammed by the stud 182 as to rotate the detent 184 about a sufficiently large counterclockwise angle, against the force exerted by spring 188, so that the end of detent 184 clears the stud 182, thereby permitting further movement of the control slide 70 to the right. After the stud 182 is moved sufficiently to the right to clear the detent 184, detent 184 may restore to the position shown in Fig. 10 with its lower arm engaging the stop pin 192. It will be recognized that if thereafter the control slide 70 is moved to the left to place the apparatus in the rewind condition, the stud 182 will strike the upper surface 194 of the detent 184 to cam that detent out of the path of travel of the stud 182. After the stud 182 has cleared the detent 184, the detent 184 will restore to the position shown in Fig. 10 in preparation for further engagement between it and the stud 182 to again define a pause position.

When the control lever 56 is forced beyond the pause position to the record-playback position, the apparatus assumes the position shown in Fig. 1 of the drawings and by the solid or dotted line representation in Fig. 11, the dash-dot line representation in Fig. 11 again showing the position of the elements during the rewind condition of the apparatus.

At this further movement to the right of the control slide 70, the left-hand edge of the aperture 101 in the enlarged end portion 103 again forces the stud 100 to the right to rotate the rewind wheel arm 86 about a further counterclockwise angle. Since the rewind wheel 92 is already disengaged from the motor shaft 108 as a result of the prior attainment of the pause position, this further movement of the rewind wheel arm 86 produces no different result.

As the control slide 70 is moved to the right, the roller on the stud 164 travels down the inclined surface 172 of the control slide 70 under the influence of the spring 168. This results in a clockwise rotation of the pressure roll arm 158 to bring the rubber pressure roll 50 into contact with the tape and to force the tape into engagement with the rubber surface of the capstan shaft 46 to establish a controlled-speed driving engagement between the capstan and the tape. It will be noted that the inclined surface 172 of the control slide 70 extends sufficiently so that the roller on the stud 164 will become disengaged from that surface when the apparatus is in the record or playback position. This insures that the force exerted by the pressure roll 50 on the tape and against the rubber covered shaft 46 will be controlled solely by the force exerted by spring 168 even though with extensive use of the apparatus the surfaces of the rubber pressure roll 50 and of the rubber covered capstan shaft 46 may wear.

Further, when the control slide 70 is moved to the right to the position shown in Fig. 11, the roller mounted upon the stud 40 travels a distance up the inclined surface 174 of the of the control slide 70, permitting the pressure pad 44 to rotate in a counterclockwise direction about its pivot 42 to establish an intimate engagement between the tape and the magnetic head assembly 34. When that engagement is established and maintained, as a result of the force exerted by spring 176, the roller mounted upon stud 40 actually clears the surface 174 again to insure that the force exerted is dependent solely upon the spring tension.

The further movement of the control slide 70 to the right also permits the idler wheel bearing plate 126 to be rotated through a further clockwise angle about its pivot 32, permits the link 154 to be further elevated and permits the bellcrank 144 to be further rotated in a clockwise direction to an extent limited by the engagement of the roller 148 with the front surface of the portion 68 of the control slide 70, all under the impetus of the force exerted by the spring 138. This movement of the bearing plate 126 and of the idler pulley 120 to an advanced clockwise position further increases the force between the belt 118 and the plastic roller 132, it being noted that in this position of the element there is preferably a small amount of wrap of the belt 118 on the laminated plastic roller 132. By virtue of this arrangement, an affirmative frictional driving relationship is established whereby the reel 30 is capable of picking up the tape as rapidly as it is supplied thereto from the capstan shaft 46. The relationships are preferably so established that the reel 30 tends to take up the tape faster than it is supplied from the capstan even when there is but little tape wound upon the take-up reel 30 to create an enlarged arbor. Some slip does therefore occur between the belt 118 and the laminated plastic roller 132 in this operational position of the apparatus.

It is important during either recording or playing back that some retarding force be applied to inhibit the freedom of rotation of the supply reel 36 in order to prevent over-travelling and spilling of the tape and to otherwise insure proper operation of the apparatus. However, this drag applied to the supply reel and hence to the tape must be exceedingly uniform if "flutter" or "wow," caused by variation in tape speed, are to be avoided.

In the disclosed embodiment of the invention, this constancy of drag is achieved by bearing loading. Thus, as may be most clearly seen in Fig. 4 of the drawings, the rubber belt 96 is of proper length so that when placed around the pulleys 94 and 98 it is under tension. There is a constant pressure exerted by the supply-reel spindle 38 against the spindle bearing 84 and a constant pressure exerted by the rewind wheel bearing 90 against the stud or trunnion 88 on which it revolves. As a result of this loading of the bearings 84 and 90, a highly constant force retards the rotation of the supply reel 36.

Since as before described the ratios are so established that the take-up reel 30 is capable of accepting tape at a rate in excess of that at which it is supplied by the capstan 46, provision may readily be made for skipping a portion of the tape either during the recording or the playback operation. If the control lever 56 is shifted to the skip or fast forward position, the actuating stud 64 forces the control slide 70 to the right to its extreme position. In so doing, the rewind wheel 92 is still further separated from the motor shaft 108, but no change in the operation results therefrom, the supply reel 36 still being free to rotate against a uniform resistive force. However, as the control slide 70 approaches the position shown in solid or dotted lines in Fig. 12 of the drawings, the inclined surface 196 engages the roller mounted upon the stud 40 to rotate the pressure pad 44 about a small angle in a clockwise direction. As a result, the pressure upon the tape is relieved but the tape is still forced to travel in proximity to the magnetic head assembly 34 so that the recorded material may still be sensed although possibly at reduced volume and with reduced clarity.

The roller 166 (Fig. 8) mounted upon the pressure roll arm 158 (Fig. 12) is engaged by the inclined surface 198 on the control slide 70 to force that roller upwardly against the force exerted by spring 168, thereby to rotate the pressure roll arm 158 through a counterclockwise angle of sufficient magnitude to release the engagement of the pressure roll 50 and the capstan shaft 46 with the tape.

Upon the additional movement to the right of control slide 70, the bellcrank 144 is freed to rotate through an additional clockwise angle, and it will so rotate until a point is reached wherein the increased force of engagement between the belt 118 and the laminated plastic roller 132 effectively equals the reduced force exerted by the substantially fully retracted spring 138 tending to rotate the idler wheel bearing plate 126 in a clockwise direction. As is shown in Fig. 12 of the drawings, the roller 148 on bellcrank 144 separates from the left-hand edge of the portion 68 of the control slide 70.

As a result of these positional changes, a somewhat increased frictional force of engagement exists between the belt 118 and the roller 132. Further, the primary forces tending to retard the motion of the tape, the force exerted by the pressure roll 50 against the tape and against the capstan shaft 46 and the force exerted by the pressure pad 44, have been relieved, as described. Therefore the tape travels at a higher speed than during the normal record or playback operation, substantially no slippage occurring between the belt 118 and the roller 132, and substantially the only retarding force being that which results from the loading of the bearings in the supply reel transmission train as previously described.

It will therefore be seen that a unitary control slide 70 is employed to control the shifting of a plurality of mechanical elements to place the apparatus in a plurality of operative conditions, that the primary drive is attained by means of belts which serve both a driving and a braking function, and that both a fast forward and a pause condition are capable of being established by virtue of the construction described permitting substantially improved performance of tape recording mechanisms.

While it will be apparent that the embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a magnetic tape handling mechanism, a reel for carrying the magnetic tape, a first and a second pulley, a belt engaging said pulleys, means for rotating said first pulley, a roller for driving said reel frictionally engaging said belt, means for varying the degree of frictional engagement between said belt and said roller, and means for rotating said roller in a direction opposite to the direction of the rotational force applied to said roller by said belt.

2. In a magnetic tape handling mechanism, a reel for carrying the magnetic tape, a belt, means for driving said belt, a roller for driving said reel engaging said belt, said belt tending to drive said roller at a selected speed, capstan means driven at a predetermined speed and engaging the tape for retarding the rotation of said roller to a speed less than said selected speed, and means for selectively disabling the retarding effect of the capstan means on the tape while maintaining said drive of the roller at a selected speed for permitting skipping of portions of the tape, said means including means for releasing the said capstan means from engagement with the tape.

3. In a magnetic tape handling mechanism, a reel for carrying the magnetic tape, a roller for driving said reel, means rotatably supporting said roller, a first pulley in fixed spatial relationship with said roller, a second pulley, a pivotally mounted plate rotatably supporting said second pulley, a belt trained around said pulleys and engaging said roller, and means for pivoting said plate to vary the degree of wrap-around of said belt on said roller and to vary the force of engagement between said roller and said belt.

4. In a magnetic tape handling mechanism, a reel for carrying the magnetic tape, a rotatable shaft, a pivotable plate, a wheel rotatably mounted on said plate, means including said wheel for driving said reel, and means for pivoting said plate for moving said wheel to and from driving engagement with said shaft comprising a control slide having a portion lying in spaced parallelism with a portion of said plate, said control-slide portion having an aperture, a stud mounted on said plate and extending through the aperture in said control-slide portion, a tensioned spring engaging said stud and anchored to said control slide, and means for moving said slide in either of two directions.

5. In a magnetic tape handling mechanism, a pair of reels for carrying the magnetic tape, a first, a second, a third, and a fourth pulley, means including said fourth pulley for driving one of said reels, a first belt engaging said first and said second pulleys, a second belt engaging said third and said fourth pulleys, a roller for driving the other one of said reels and engaging said first belt, means driving said first pulley, means for selectively driving said third pulley, means including said one reel and the tape and effective when said third pulley is driven for rotating said roller, means including said first belt for imposing a force on said roller resisting that rotation, and means including said second belt for resisting rotation of said fourth pulley.

6. In a magnetic tape handling mechanism including a capstan, a tape supply reel and a take-up reel and having a forward position in which the tape is transported to said take-up reel from said supply reel under the control of said capstan and a reverse position in which the tape is transported to said supply reel from said take-up reel, the combination of a motor, a first rotatable member driven by said motor, a belt driven by said first rotatable member, a second rotatable member frictionally engaging said belt and driving said take-up reel, manual controller means having two positions for adjusting the relationship between said belt and said second rotatable member between two discrete finite degrees of frictional engagement, means including said belt and said first and second rotatable members and effective in one position of said manual controller means for positively driving said take-up reel in a first direction during forward movement of said tape, means for positively driving said supply reel in one direction during reverse movement of said tape whereby said take-up reel is rotated by said tape in a second direction opposite to said first direction, and means including said belt and said first and second rotatable members and effective in the other position of said manual controller means for exerting a torque upon said take-up reel in said first direction for exerting a uniform braking force on said take-up reel during the reverse movement of said tape.

7. The combination of claim 6 further including a third rotatable member and in which said belt is trained around said first and third rotatable members, and in which said second rotatable member is a roller mounted on a common shaft with the take-up reel and engaging said belt along a reach thereof between said first and third rotatable members.

8. The combination of claim 7 in which said manual controller means comprises means for shifting said second and third rotatable members relative to one another between two preselected discrete positions.

9. In a magnetic tape handling mechanism including a capstan, a tape supply reel and a take-up reel and having a forward position in which the tape is transported to said take-up reel from said supply reel under the control of said capstan, a fast forward position in which the tape is transported to said take-up reel from said supply reel independently of control by said capstan, and a reverse position in which the tape is transported to said supply reel from said take-up reel, the combination of a motor, a first rotatable member driven by said motor, a belt driven by said first rotatable member, a second rotatable member frictionally engaging said belt and driving said take-up reel, manual controller means having forward, fast forward and reverse positions for adjusting the relationship between said belt and said second rotatable member between a first finite degree of frictional engagement in said forward position, a second greater degree of frictional engagement in said fast forward position, and a third finite degree of frictional engagement less than said first degree but still substantial in said reverse position, means including said belt and said first and second rotatable members and effective in said forward and in said fast forward positions of said manual controller means for positively driving said take-up reel in a first direction during forward movement of said tape, means for positively driving said supply reel in one direction during reverse movement of said tape whereby said take-up reel is rotated by said tape in a second direction opposite to said first direction, and means including said belt and said first and second rotatable members and effective in said reverse position of said manual controller means for exerting a torque upon said take-up reel in said first direction for exerting a uniform braking force on said take-up reel during the reverse movement of said tape.

10. In a magnetic tape handling mechanism including a capstan, a tape supply reel and a take-up reel and having a forward position in which the tape is transported to said take-up reel from said supply reel under the control of said capstan, a pause position in which the tape is brought to a halt, and a reverse position in which the tape is transported to said supply reel from said take-up reel, the combination of a motor, a first rotatable member driven by said motor, a belt driven by said first rotatable member, a second rotatable member frictionally engaging said belt and driving said take-up reel, manual controller means having forward, pause and reverse positions for adjusting the relationship between said belt and said second rotatable member between a first finite degree of frictional engagement in said forward position, a second and lesser degree of frictional engagement in said pause position, and a third and still less but still substantial degree of frictional engagement in said reverse position, means including said belt and said first and second rotatable members and effective in said forward position of said manual controller means for positively driving said take-up reel in a first direction during forward movement of said tape, means for positively driving said supply reel in one direction during reverse movement of said tape whereby said take-up reel is rotated by said tape in a second direction opposite to said first direction, means including said belt and said first and second rotatable members and effective in said reverse position of said manual controller means for exerting a torque upon said take-up reel in said first direction for exerting a uniform braking force on said take-up reel during the reverse movement of said tape, means for terminating drive of said supply reel in said pause position of said manual controller means, and means including said belt and said first and second rotatable members and effective in said pause position for exerting a uniform braking force on said take-up reel.

11. In a magnetic tape handling mechanism including a capstan, a tape supply reel and a take-up reel and having a fast forward position in which the tape is transported to said take-up reel from said supply reel independently of the control by said capstan, a forward position in which the tape is transported to said take-up reel from said supply reel under the control of said capstan, a pause position in which the tape is brought to a halt, and a reverse position in which the tape is transported to said supply reel from said take-up reel, the combination of a motor, a first rotatable member driven by said motor, a belt driven by said first rotatable member, a second rotatable member frictionally engaging said belt and driving said take-up reel, manual controller means having fast forward, forward, pause and reverse positions for adjusting the relationship between said belt and said second rotatable member between a first finite degree of frictional engagement in said forward position, a second and greater degree of frictional engagement in said fast forward position, a third and lesser degree of frictional engagement in said pause position, and a fourth and still less but still substantial degree of frictional engagement in said reverse position, means including said belt and said first and second rotatable members and effective in said forward and said fast forward positions of said manual controller means for positively driving said take-up reel in a first direction during forward movement of said tape, means for positively driving said supply reel in one direction during reverse movement of said tape whereby said take-up reel is rotated by said tape in a second direction opposite to said first direction, means including said belt and said first and second rotatable members and effective in said reverse position of said manual controller means for exerting a torque upon said take-up reel in said first direction for exerting a uniform braking force on said take-up reel during the reverse movement of said tape, means for terminating drive of said supply reel in said pause position of said manual controller means, and means including said belt and said first and second rotatable members and effective in said pause position for exerting a uniform braking force on said take-up reel.

References Cited in the file of this patent

UNITED STATES PATENTS

| | | |
|---|---|---|
| 752,778 | Hundhausen | Feb. 23, 1904 |
| 789,642 | White et al. | May 9, 1905 |
| 2,069,595 | Thomas | Feb. 2, 1937 |
| 2,257,172 | Klemola | Sept. 30, 1941 |
| 2,509,054 | Davis | May 23, 1950 |
| 2,524,064 | Masterson et al. | Oct. 3, 1950 |
| 2,539,858 | Offutt | Jan. 30, 1951 |
| 2,555,643 | Harrison | June 5, 1951 |
| 2,558,432 | Haloski | June 26, 1951 |
| 2,617,890 | Barany | Nov. 11, 1952 |
| 2,664,758 | Smits | Jan. 5, 1954 |
| 2,712,448 | Schroter | July 5, 1955 |
| 2,721,040 | Grantham | Oct. 18, 1955 |
| 2,778,580 | Howell et al. | Jan. 22, 1957 |
| 2,877,958 | Moore et al. | Mar. 17, 1959 |